United States Patent

Palm

[11] Patent Number: 5,314,366
[45] Date of Patent: May 24, 1994

[54] ADAPTER CHAINRING

[76] Inventor: Kirby A. Palm, Rte. 1, Box 3498, Havana, Fla. 32333

[21] Appl. No.: 36,737

[22] Filed: Mar. 25, 1993

[51] Int. Cl.$^5$ ............................................. F16H 55/30
[52] U.S. Cl. ...................................... 474/152; 474/160
[58] Field of Search ...................... 474/152, 160, 162; 74/594.1, 594.2, 594.3

[56] References Cited

U.S. PATENT DOCUMENTS

| | | | |
|---|---|---|---|
| 3,082,637 | 10/1961 | Paxton | 74/243 |
| 4,009,621 | 3/1977 | Segawa | 74/243 |
| 4,144,773 | 3/1979 | Addicks | 74/243 |
| 4,259,880 | 4/1981 | Ueno | 74/594.2 |
| 4,583,422 | 4/1986 | Boyd | 74/594.2 |
| 4,988,328 | 1/1991 | Iwasaki et al. | 474/160 |
| 5,213,550 | 5/1993 | Wu | 474/160 |
| 5,217,413 | 6/1993 | Nagano | 474/160 X |

FOREIGN PATENT DOCUMENTS 3932288  4/1991  Fed. Rep. of Germany.

Primary Examiner—Thuy M. Bui
Attorney, Agent, or Firm—Dowell & Dowell

[57] ABSTRACT

The invention is an adapter chainring for a multiple speed bicycle comprising a derailleur and a crankset having outer and inner chainrings. The adapter chainring has teeth disposed on its outer periphery for engaging the bicycle chain. The adapter chainring defines a plurality of holes which receive bolts to attach the adapter chainring to the crankset in place of the conventional inner chainring of a two chainring crankset, and to a third, smaller inner chainring which is added to the crankset to convert it to a three chainring crankset having additional, lower gears.

8 Claims, 4 Drawing Sheets

ADAPTER CHAINRING

BACKGROUND OF THE INVENTION

1. Field of the Invention

The invention relates to an adapter chainring for a conventional road racing bicycle crankset and, more particularly, to an adapter chainring for converting a conventional crankset having two chainrings to a crankset having three chainrings, including an additional smaller inner chainring. The invention allows the road racing crankset to be converted for applications requiring the very low gear ratios provided by the additional chainring.

2. Discussion of the Related Art

Bicycle cranksets having two and three chainrings have been known in the prior art. Two chainring cranksets comprise an outer, large diameter chainring and an inner, smaller diameter chainring. These cranksets may be used in combination with 5, 6, 7 and 8 speed freewheels, thus providing the bicycle with a range of from 10 to 16 speeds. Two chainring cranksets are commonly used in road racing bicycles which are primarily designed for road racing applications.

Three chainring cranksets comprise an outer, large chainring; a middle, smaller diameter chainring; and an inner, still smaller diameter chainring. They are used in bicycling applications where still lower gears are required, such as in touring and off-road bicycles referred to as "mountain bikes." These bicycles may have as many as 24 gears due to the additional third chainring. Consequently, these bicycles are ideally suited for climbing steep elevations and maneuvering on rugged off-road terrain where the very lowest gears are required.

The above-described prior art two and three chainring cranksets are, however, essentially limited in their utility to the specific applications for which they were designed. More particularly, road racing bicycles having two chainring cranksets are poorly suited for touring and off-road uses.

SUMMARY OF THE INVENTION

The present invention has been made in view of the above inadequacies of the prior art and has as an object to provide an adapter chainring that can be used to easily adapt a two chainring crankset to a three chainring crankset so that the bicycle may be used in bicycling applications where lower gear ratios are necessary, and which allows the crankset to be easily converted back to a two chainring crankset.

Another object of the present invention is to provide a adapter chainring for two chainring cranksets which allows bicyclists already owning bicycles having two chainring cranksets to install lower gears without the need to purchase a new three chainring crankset.

A further object of the present invention is to provide an adapter chainring which allows a road racing crankset to be used wherever a touring or off-road crankset would be used.

A still further object of the present invention is to provide an adapter chainring which permits the fitting of commercially popular and prestigious racing-type cranksets to bicycles sold for touring and off-road use.

Additional objects and advantages of the present invention will become apparent from the description which follows, considered in conjunction with the drawing figures, or by practice of the invention.

To achieve the objects of the invention, as embodied and broadly described herein, the adapter chainring of the present invention comprises a ring-like plate having inner and outer faces. The ring-like plate has a plurality of teeth on the outer periphery. The inner face of the adapter chainring defines a plurality of outer holes which are countersunk from the inner face for receiving bolts to attach the adapter chainring to the crankset of a conventional two chainring crankset in place of the conventional inner chainring, and the outer face defines a plurality of inner holes which are countersunk from the outer face for receiving bolts to attach the adapter chainring to a third, smaller chainring, having an outer diameter smaller than the outer diameter of the inner chainring associated with the conventional two chainring crankset.

DETAILED DESCRIPTION OF THE PREFERRED EMBODIMENT

Figure 1:
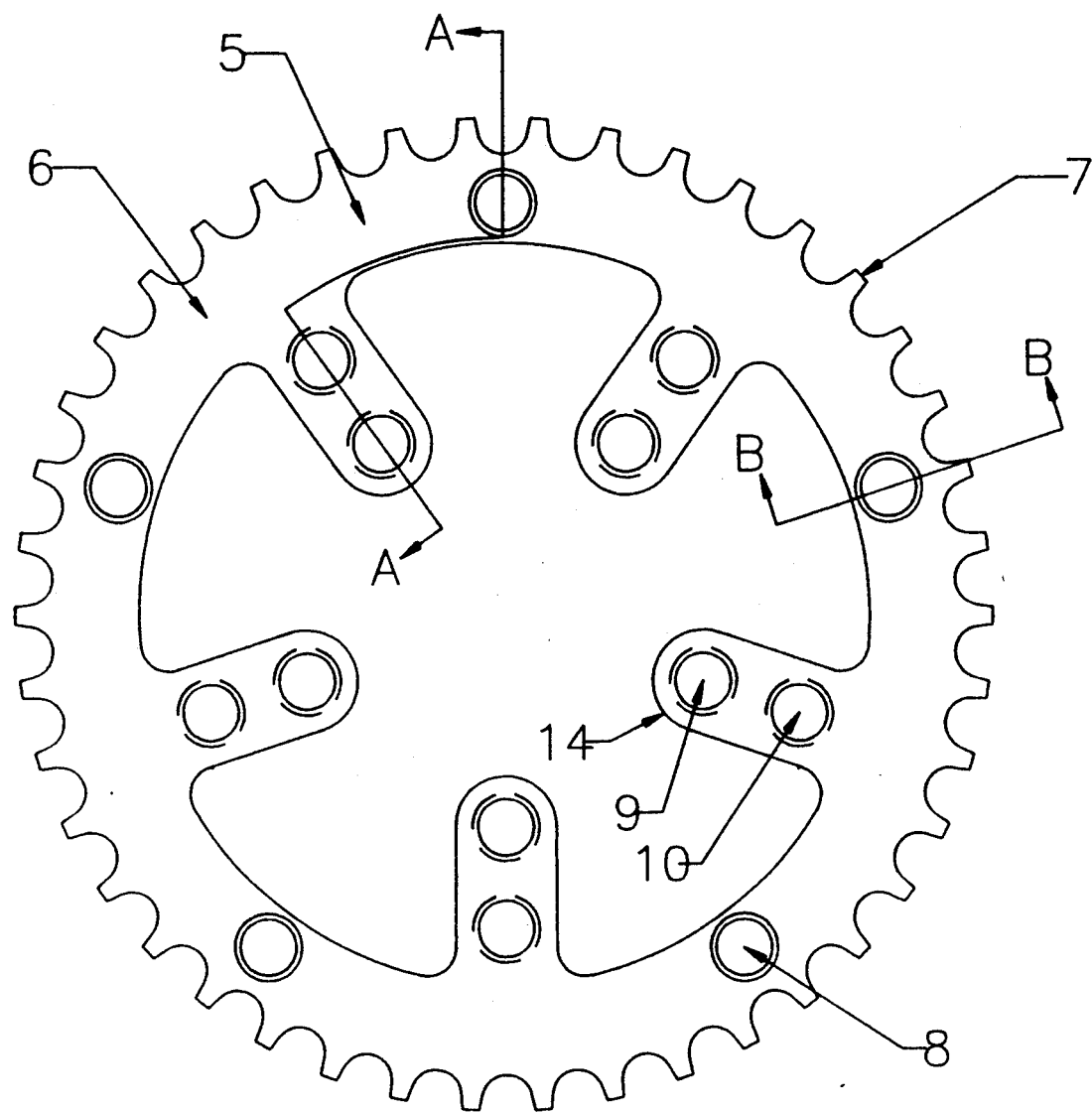
FIG. 1 is a plan view of the adapter chainring of the present invention showing the inner face thereof.
Figure 2:
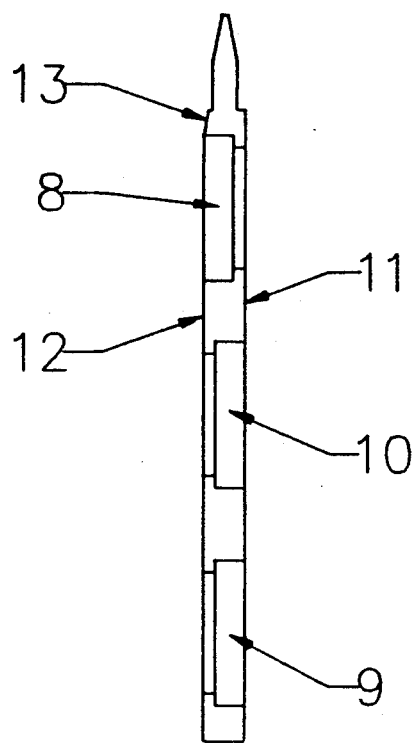
FIG. 2 is a cross-sectional view taken along line A—A in FIG. 1.
Figure 3:
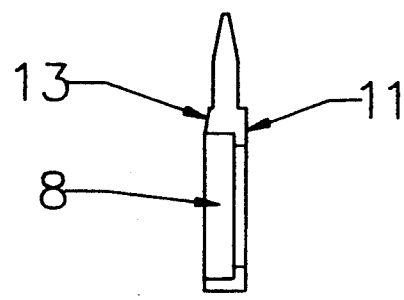
FIG. 3 is a cross-sectional view taken along line B—B in FIG. 1.

With reference to the drawings, FIGS. 1–3 depict the adapter chainring in accordance with the preferred embodiment of the invention. The adapter chainring 5 comprises a ring-like plate 6 which has a plurality of teeth 7 disposed on the outer periphery thereof. The number and characteristics of the teeth are conventional. For example, there may be 35, 36, 38, 40, 42 or 44 teeth, as are found in the middle chainring of conventional three chainring cranksets.

The ring-like plate 6 of the adapter chainring in accordance with the invention has an outer face 11 and an inner face 12. The outer face optionally defines two sets of inner holes, a first set of inner holes 9 and a second set of inner holes 10, for receiving attachment bolts or "pins" 18, 19 (see FIGS. 4 and 5). The pins consist of a bolt and a nut. The nut has an internally threaded sleeve-like appearance, and the nut is pulled flush when assembled. As depicted in FIG. 1, the inner holes 9 and 10 are located through inwardly and radially oriented projections 14 of the ring-like plate 6. As depicted in FIG. 2, the inner holes 9 and 10 are countersunk at the outer face 11 of the plate. The inner holes are provided to receive bolts to attach the adapter chainring to a third inner chainring to convert the two-chainring crankset to a three-chainring crankset. The bolts are received in only a selected one of the first or second sets of inner holes. The particular set of inner holes which receives the bolts depends on the hole pattern of the inner chainring. The bolts are preferably selected to have such a length that when the bolts are fully received in the inner holes, the heads of the bolts are flush with the outer face 11 of the adapter chainring.

In accordance with the invention, the first and second sets of inner holes may be located on the adapter chainring at positions corresponding to the hole patterns of conventional inner chainrings such as "SUGINO" TM chainrings, which are standard equipment for touring and off-road bicycles. In accordance with the invention, the shape of the ring-like plate 8 may be varied in order to accommodate the different hole patterns required to match the conventional cranksets.

When the third inner chainring is attached to the adapter chainring, a selected number of conventional spacers 23 (shown in FIG. 5) are located intermediate to the third inner chainring and the adapter chainring, and surrounding a number of the bolts.

As also depicted in FIGS. 1 and 2, the ring-like plate defines a plurality of outer holes 8. The outer holes are located further from the center of the adapter chainring than are the inner sets of holes. The outer holes are countersunk from the inner face 12 to receive attachment bolts to attach the adapter chainring to the crankset. The heads of the bolts are flush with the inner face 12 when the bolts are fully received in the outer holes 8. The locations of the outer holes ar selected to correspond with the bolt hole pattern of the outer chainring. In accordance with the invention, the outer holes may be located to correspond with the locations of the holes of the outer chainring of conventional cranksets such as those manufactured by "CAMPAGNOLO" TM, "SHIMANO" TM and "STRONGLIGHT" TM, which are available as standard equipment on many high-performance bicycles.

In accordance with the invention, the adapter chainring has a beveled portion 13 on the inner side adjacent to the teeth of the adapter chainring, as depicted in FIGS. 2 and 3. The beveled surface is provided on the inner face to provide clearance for the bicycle chain.

As embodied herein, the adapter chainring is preferably composed of an aluminum alloy. The adapter chainring may be composed of other preferably lightweight materials, and may have a coating of a hard, ceramic material or the like at locations subject to high levels of wear.

Figure 4:
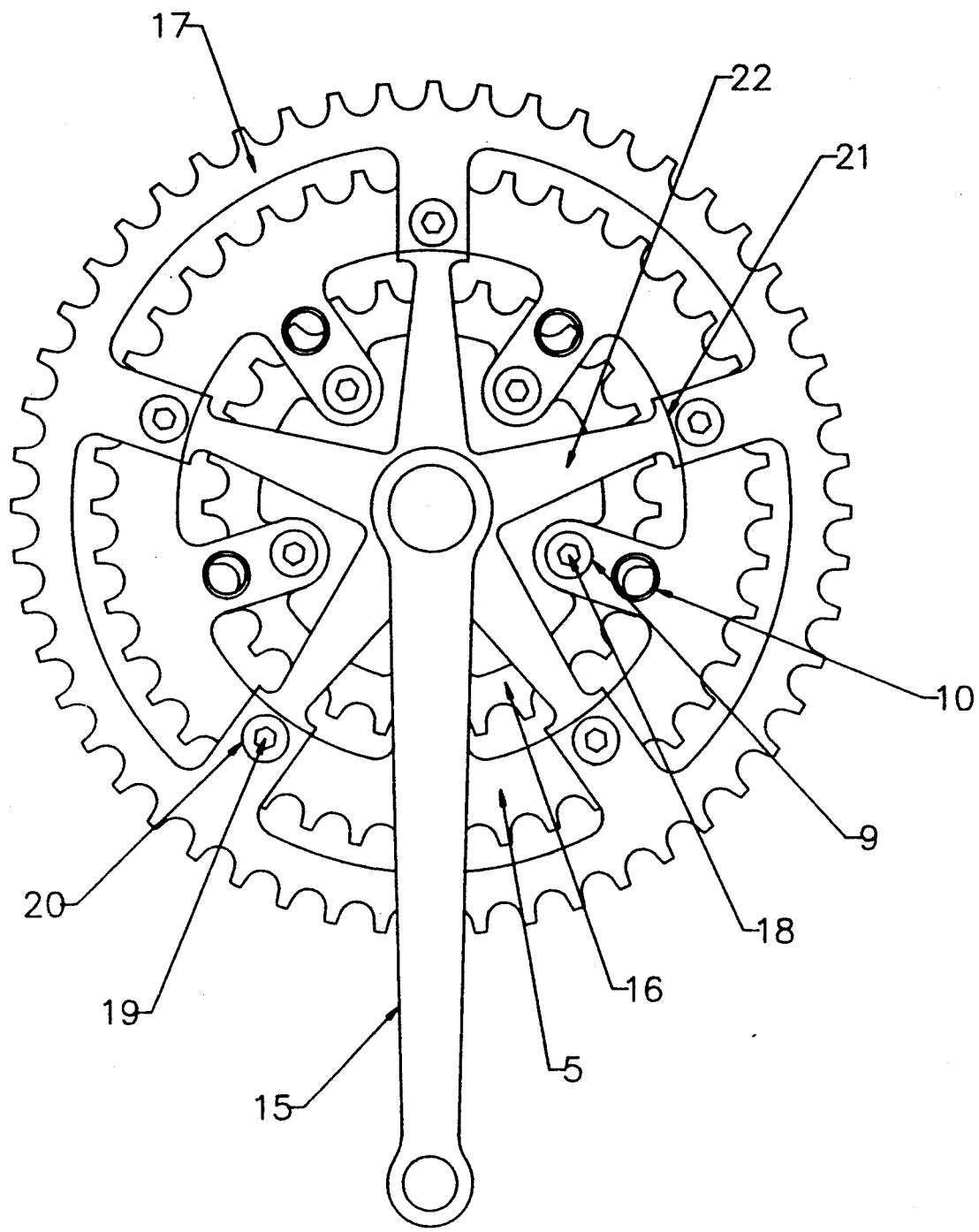
FIG. 4 is a plan view of a two chainring bicycle crankset that has been converted to a three chainring crankset by attachment of the adapter chainring in place of the conventional chainring and a third inner chainring.
Figure 5:
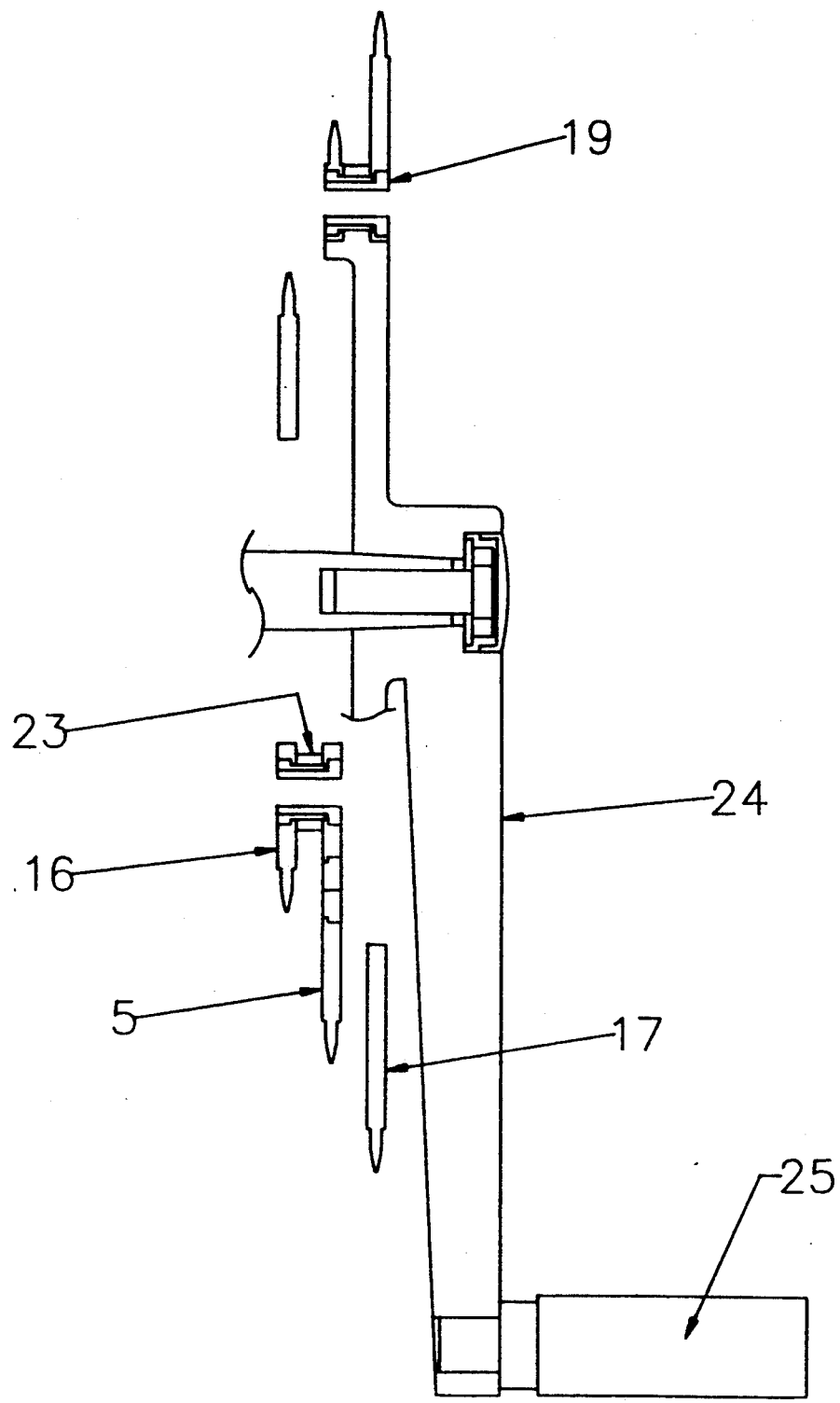
FIG. 5 is a cross-sectional view of a portion of a two chainring crankset that has been converted to a three chainring crankset by attachment of an adapter chainring and a third inner chainring.

FIGS. 4 and 5 depict a two chainring crankset that has been converted to a three chainring crankset by removing the conventional inner chainring (not shown) and attaching an adapter chainring 5 and a third inner chainring 16 to the crankset 15.

In order to use the adapter chainring in accordance with the present invention to adapt a two chainring crankset having inner and outer chainrings, first the bicycle chain (not shown) is removed from one of the respective chainrings. Next, depending on the particular size of the inner chainring and the particular characteristics of the parts involved, the crankset may be removed. The conventional inner chainring is removed from the crankset by removing the attachment bolts connecting it to the crankset. The adapter chainring is attached to the crankset by inserting bolts 19 through the outer holes 8 and driving them into the holes 20 in the outer chainring until the bolts are substantially flush with the inner face of the adapter chainring. The adapter chainring is then attached to the third inner chainring 16 by inserting bolts 18 through inner holes 9 or 10 (holes 9 in FIG. 4) and driving them into the holes (not shown) in the inner chainring until the heads of the bolts are substantially flush with the outer face of the adapter chainring. The inner holes 9 or 10 which receive the attachment bolts are determined by the particular hole pattern of the second inner chainring. The crankset is then reconnected to the bicycle and the chain is positioned on a chainring.

As also shown in FIG. 4, the conventional crankset 15 has steps 21 on the inner and outer surfaces of the spider 22, over which the chainrings are fit. The steps define portions of a circle, and the inner edges of the outer chainrings are circular shaped and of the same diameter as that circle. If the outer chainring is sufficiently large to have radially inward projections for the mounting holes as shown, and as is typical, then the inner edges of those radially inward projections are of that same diameter. This structure creates a smooth, continuous outer surface between the spider and the outer chainring. For the adapter chainring to fit such a crankset, it must have that same diameter for a short distance around each of the outer mounting holes 8. Accordingly, the radially oriented projections 14 of the adapter chainring are located between the outer mounting holes, rather than collinear with them.

As shown in FIG. 5, spacers 23 are located between the adapter chainring 5 and the third inner chainring 16. FIG. 5 further depicts a crankarm 24 having a pedal 25 attached at one end thereof.

From the foregoing, it is understood that the adapter chainring in accordance with the invention functions as both an adapter to convert two chainring cranksets to three chainring cranksets, and as the intermediate chainring of the three chainring crankset.

When it is desired to convert the crankset back to a racing configuration, the adapter chainring and the third or inner chainring are simply removed and the conventional inner chainring is reattached to the crankset.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. An adapter chainring for converting a bicycle conventional two-chainring crankset, including outer and inner chainrings, to a three-chainring crankset including a third, inner chainring having an outer diameter smaller than the outer diameter of the conventional inner chainring, by replacing the conventional inner chainring with the adapter chainring and adding a third, inner chainring to the conventional crankset, said adapter chainring comprising:

a ring-like plate having inner and outer faces and an outer periphery, a plurality of teeth on said outer periphery, a plurality of spaced outer holes in said plate for receiving bolts for attaching said adapter chainring to the conventional inner chainring, and a plurality of spaced inner holes in said plate for receiving bolts for attaching said adapter chainring to the third, inner chainring.

2. The adapter chainring of claim 1, wherein said inner holes and said outer holes are equally spaced with respect to one another.

3. The adapter chainring of claim 2, wherein said inner holes include at least two concentric sets of holes, wherein each of the holes of each inner set of holes is substantially equidistant from said periphery of said adapter chainring.

4. The adapter chainring of claim 3, wherein said inner and outer holes include countersunk portions.

5. The adapter chainring of claim 4, wherein said outer holes are countersunk from said inner face of said plate and said inner holes are countersunk from said outer face of said plate.

6. The adapter chainring of claim 1, wherein said inner and outer holes include countersunk portions.

7. The adapter chainring of claim 6, wherein said outer holes are countersunk from said inner face of said plate and said inner holes are countersunk from said outer face of said plate.

8. The adapter chainring of claim 1, wherein said inner face of said adapter chainring is beveled adjacent to said teeth.

* * * * *